United States Patent
Zhang et al.

(10) Patent No.: US 10,735,164 B2
(45) Date of Patent: Aug. 4, 2020

(54) DATA TRANSMISSION METHOD, APPARATUS, USER EQUIPMENT, AND BASE STATION

(71) Applicant: Huawei Technologies Co., Ltd., Shenzhen (CN)

(72) Inventors: Jian Zhang, Shenzhen (CN); Qinghai Zeng, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/393,686

(22) Filed: Apr. 24, 2019

(65) Prior Publication Data
US 2019/0253216 A1    Aug. 15, 2019

Related U.S. Application Data

(63) Continuation of application No. PCT/CN2017/107632, filed on Oct. 25, 2017.

(30) Foreign Application Priority Data

Oct. 25, 2016   (CN) .......................... 2016 1 0934624

(51) Int. Cl.
*H04L 5/00* (2006.01)
*H04W 72/08* (2009.01)
(Continued)

(52) U.S. Cl.
CPC ......... *H04L 5/0048* (2013.01); *H04B 7/0689* (2013.01); *H04W 24/02* (2013.01);
(Continued)

(58) Field of Classification Search
CPC .. H04L 5/0048; H04W 24/02; H04W 72/085; H04W 76/15; H04W 36/30; H04W 88/02; H04W 88/085; H04B 7/0689; H04B 7/022
See application file for complete search history.

(56) References Cited

U.S. PATENT DOCUMENTS

2005/0176430 A1 * 8/2005 Lee ................... H04W 72/1284
                                                                  455/436
2014/0119286 A1   5/2014 Kuehnel
(Continued)

FOREIGN PATENT DOCUMENTS

| CN | 102348249 A | * 2/2012 | ............... H04L 1/06 |
|---|---|---|---|
| CN | 102348249 A |   2/2012 | |

(Continued)

OTHER PUBLICATIONS

"NR UP Design for URLLC," 3GPP TSG-RAN WG2 #96, Reno, Nevada, USA, R2-168629, XP051193135, pp. 1-3, 3rd Generation Partnership Project—Valbonne, France (Nov. 14-18, 2016).

*Primary Examiner* — Afsar M Qureshi
(74) *Attorney, Agent, or Firm* — Leydig, Voit & Mayer, Ltd.

(57) ABSTRACT

A data transmission method, includes: a terminal performs, when the terminal performs transmission of same data with both a first base station accessed by the terminal and a second base station accessed by the terminal, transmission of to-be-transmitted data of the terminal with the first base station by using a first logical channel; and perform, transmission of the to-be-transmitted data with the second base station by using a second logical channel, where the first logical channel and the second logical channel are associated with a same radio bearer of the terminal. Therefore, reliability of a radio link is improved, and a latency of data transmission is reduced.

18 Claims, 9 Drawing Sheets

(51) Int. Cl.
*H04B 7/06* (2006.01)
*H04W 24/02* (2009.01)
*H04W 88/08* (2009.01)
*H04W 88/02* (2009.01)
*H04B 7/022* (2017.01)
*H04W 36/30* (2009.01)
*H04W 76/15* (2018.01)

(52) U.S. Cl.
CPC ........... *H04W 72/085* (2013.01); *H04B 7/022* (2013.01); *H04W 36/30* (2013.01); *H04W 76/15* (2018.02); *H04W 88/02* (2013.01); *H04W 88/08* (2013.01); *H04W 88/085* (2013.01)

(56) References Cited

U.S. PATENT DOCUMENTS

| | | | | |
|---|---|---|---|---|
| 2016/0029308 A1* | 1/2016 | Wu | .................. | H04W 16/10 370/311 |
| 2016/0255619 A1* | 9/2016 | Yi | .................. | H04W 24/08 370/252 |
| 2017/0127308 A1* | 5/2017 | Li | .................. | H04W 72/0433 |
| 2017/0196038 A1* | 7/2017 | Zeng | .................. | H04W 72/0453 |
| 2018/0098250 A1* | 4/2018 | Vrzic | .................. | H04W 36/0016 |
| 2018/0124649 A1* | 5/2018 | Yu | .................. | H04W 36/00 |
| 2018/0376422 A1* | 12/2018 | Shu | .................. | H04W 76/27 |
| 2019/0053036 A1* | 2/2019 | Liu | .................. | H04W 48/14 |
| 2019/0305877 A1* | 10/2019 | Lee | .................. | H04W 74/08 |

FOREIGN PATENT DOCUMENTS

| | | |
|---|---|---|
| CN | 104168624 A | 11/2014 |
| CN | 104581917 A | 4/2015 |
| CN | 104602294 A | 5/2015 |
| CN | 104936302 A | 9/2015 |
| CN | 105376801 A | 3/2016 |
| CN | 105451262 A | 3/2016 |
| CN | 105659690 A | 6/2016 |
| CN | 105704197 A | 6/2016 |
| EP | 2738960 A1 | 6/2014 |
| WO | 2015060544 A1 | 4/2015 |
| WO | 2016112949 A1 | 7/2016 |
| WO | 2018059557 A1 | 4/2018 |
| WO | WO-2018059557 A1 * | 4/2018 ........ H04W 36/0016 |

\* cited by examiner

DATA TRANSMISSION METHOD, APPARATUS, USER EQUIPMENT, AND BASE STATION

CROSS-REFERENCE TO RELATED APPLICATIONS

This application is a continuation of International Application No. PCT/CN2017/107632, filed on Oct. 25, 2017, which claims priority to Chinese Patent Application No. 201610934624.X, filed on Oct. 25, 2016. The disclosures of the aforementioned applications are hereby incorporated by reference in their entireties.

TECHNICAL FIELD

The present disclosure relates to the field of communications technologies, and in particular, to a data transmission method, apparatus, user equipment, and a base station.

BACKGROUND

In a current wireless communications system, to ensure mobility of a user equipment (UE) and provide higher bandwidth for the UE, the UE may access a plurality of base stations simultaneously, so that the plurality of base stations can serve the UE simultaneously. In this case, data transmission between the UE and the plurality of base stations is a focus in the industry.

That the UE simultaneously accesses two base stations is used as an example. Based on roles of the two base stations, the two base stations are referred to as a primary base station and a secondary base station. When the UE transmits data to the primary base station, the UE may directly transmit the data to the primary base station, or may first transmit the data to the secondary base station, and the secondary base station forwards the data to the primary base station. Likewise, when the primary base station transmits data to the UE, the primary base station may directly transmit the data to the UE, or may first transmit the data to the secondary base station, and the secondary base station forwards the data to the UE. When the data transmission fails, retransmission is performed based on the foregoing process.

In a process of implementing the present disclosure, the prior art has the following disadvantages:

When the data transmission fails due to a relatively poor condition of a radio channel between the UE and the primary base station or a relatively poor condition of a radio channel between the UE and the secondary base station, a plurality of retransmissions may be needed for successful transmission. The plurality of retransmissions may cause a high network latency of data transmission.

SUMMARY

To resolve the problem in the prior art, the present disclosure provides a data transmission method, apparatus, user equipment, and a base station. Technical solutions are as follows.

According to a first aspect, an embodiment of the present disclosure provides a data transmission method, where the method includes:

performing, by user equipment UE when the UE performs transmission of same data with both a first base station accessed by the UE and a second base station accessed by the UE, transmission of to-be-transmitted data of the UE with the first base station by using a first logical channel between the UE and the first base station; and performing, by the UE, transmission of the to-be-transmitted data with the second base station by using a second logical channel between the UE and the second base station, where the first logical channel and the second logical channel are associated with a same radio bearer of the UE.

In this embodiment of the present disclosure, the UE performs transmission of the same data with both the first base station by using the first logical channel and the second base station by using the second logical channel. Therefore, reliability of a radio link is improved, and a latency of data transmission is reduced.

In a possible design, the method further includes:

receiving, by the UE, configuration information sent by the first base station, where the configuration information includes information about a manner in which the UE performs data transmission with the first base station and the second base station; and when the configuration information includes information indicating that the UE performs transmission of the same data with both the first base station and the second base station, performing, by the UE, transmission of the same data with both the first base station and the second base station.

In this embodiment of the present disclosure, when the UE performs transmission of the same data with both the first base station and the second base station, the configuration information that includes the information indicating that the UE performs transmission of the same data with both the first base station and the second base station is sent to the UE. Therefore, the first base station triggers that the UE performs transmission of the same data with both the first base station and the second base station, and a trigger mode is added.

In another possible design, when the first logical channel and the second logical channel each belong to a signaling radio bearer SRB, the configuration information includes the information indicating that the UE performs transmission of the same data with both the first base station and the second base station, namely, a diversity mode or a split bearer.

In another possible design, when the first logical channel and the second logical channel each belong to a data radio bearer DRB, the configuration information includes the information indicating that the UE performs transmission of the same data with both the first base station and the second base station, namely, a diversity bearer or a split bearer.

In another possible design, the method further includes:

obtaining, by the UE, a first radio condition of a current channel; and when the first radio condition meets a first preset condition, performing, by the UE, transmission of the same data with both the first base station and the second base station.

In this embodiment of the present disclosure, the UE determines, based on the first radio condition of the current channel, whether to perform transmission of the same data with both the first base station and the second base station. Therefore, when the first radio condition is poor, transmission of the same data with both the first base station and the second base station is triggered, reliability of a radio link is improved, and a latency of data transmission is reduced.

In another possible design, the first preset condition includes at least one of the following conditions:

a reference signal received power RSRP between the UE and the first base station is not greater than a first preset power, a reference signal received quality RSRQ value between the UE and the first base station is not greater than a first preset value, a channel quality indicator CQI of a radio channel between the UE and the first base station is not greater than a second preset value, a signal-to-interference-plus-noise ratio SINR of the UE is not greater than a third preset value, a signal-to-noise ratio SNR of the UE is not greater than a fourth preset value, a statistical quantity of hybrid automatic repeat request HARQ negative acknowledgements NACKs is greater than a fifth preset value, and a statistical quantity of automatic repeat request ARQ negative acknowledgements NACKs is greater than a sixth preset value.

In this embodiment of the present disclosure, the first radio condition is any information that represents a radio condition. Correspondingly, the first preset condition is a condition corresponding to any information that represents a radio condition. Therefore, a condition for triggering a process in which the UE performs transmission of the same data with both the first base station and the second base station is enriched.

In another possible design, the performing, by UE when the UE performs transmission of same data with both a first base station accessed by the UE and a second base station accessed by the UE, data of the UE with the first base station by using a first logical channel between the UE and the first base station includes:

performing, by the UE when the UE performs data transmission to the first base station and performs transmission of the same data with both the first base station and the second base station, transmission of the to-be-transmitted data of the UE with the first base station by using the first logical channel; or performing, by the UE when the UE receives the data transmitted by the first base station and performs transmission of the same data with both the first base station and the second base station, transmission of the to-be-transmitted data of the UE with the first base station by using the first logical channel.

In this embodiment of the present disclosure, during uplink transmission, the UE performs transmission of the same data with both the first base station and the second base station; and during downlink transmission, the UE may perform transmission of the same data or different data with the first base station and the second base station. During downlink transmission, the UE performs transmission of the same data with both the first base station and the second base station; and during uplink transmission, the UE may perform transmission of the same data or different data with the first base station and the second base station. Therefore, same or different transmission modes may be selected based on a specific uplink or downlink condition, to improve applicability of this solution.

In another possible design, the first base station or the second base station or both are base stations that have a radio access network central unit CU and distributed unit DU split architecture.

In this embodiment of the present disclosure, the first base station may be a conventional all-in-one base station, or may be a base station that has a radio access network CU-DU split architecture. The second base station may be a conventional all-in-one base station, or may be a base station that has a radio access network CU-DU split architecture. Therefore, application scenarios of this solution are enriched.

In another possible design, a transmission mode in which the UE performs transmission of the same data with both the first base station and the second base station is a diversity transmission mode, where the diversity transmission mode includes a diversity bearer or a diversity mode.

In this embodiment of the present disclosure, the diversity transmission mode may be the diversity bearer or may be the diversity mode. Therefore, the diversity transmission mode is enriched.

According to a second aspect, an embodiment of the present disclosure provides a data transmission method, where the method includes:

performing, by a first base station when the first base station performs transmission of same data with both user equipment UE and a second base station accessed by the UE, transmission of to-be-transmitted data of the UE with the UE by using a first logical channel between the first base station and the UE; and performing, by the first base station, transmission of the to-be-transmitted data with the second base station by using an interface between the first base station and the second base station, so that the second base station performs transmission of the to-be-transmitted data with the UE by using a second logical channel between the second base station and the UE, where the first logical channel and the second logical channel are associated with a same radio bearer of the UE.

In this embodiment of the present disclosure, when the first base station performs transmission of the same data with both the UE and the second base station, the first base station performs transmission of the to-be-transmitted data of the UE with the UE by using the first logical channel between the first base station and the UE, and performs transmission of the to-be-transmitted data with the second base station by using the interface between the first base station and the second base station, so that the second base station performs transmission of the to-be-transmitted data with the UE by using the second logical channel between the second base station and the UE. Transmission of the same data is performed with the UE by using the first logical channel and the second logical channel. Therefore, reliability of a radio link is improved, and a latency of data transmission is reduced.

In a possible design, the method further includes:

obtaining, by the first base station, a second radio condition of a current channel; and when the second radio condition meets a second preset condition, performing, by the first base station, transmission of the same data with both the UE and the second base station.

In this embodiment of the present disclosure, the first base station determines, based on the second radio condition of the current channel, whether to perform transmission of the same data with both the UE and the second base station. Therefore, when the second radio condition is poor, transmission of the same data with both the UE and the second base station is triggered, reliability of a radio link is improved, and a latency of data transmission is reduced.

In another possible design, the second preset condition includes at least one of the following conditions:

a reference signal received power RSRP between the UE and the first base station is not greater than a second preset power, a reference signal received quality RSRQ value between the UE and the first base station is not greater than a seventh preset value, a channel quality indicator CQI of a radio channel between the UE and the first base station is not greater than an eighth preset value, a signal-to-interference-plus-noise ratio SINR of the UE is not greater than a ninth preset value, a signal-to-noise ratio SNR of the UE is not greater than a tenth preset value, a statistical quantity of hybrid automatic repeat request HARQ negative acknowledgements NACKs is greater than an eleventh preset value, and a statistical quantity of automatic repeat request ARQ negative acknowledgements NACKs is greater than a twelfth preset value.

In this embodiment of the present disclosure, the second radio condition is any information that represents a radio condition. Correspondingly, the second preset condition is a condition corresponding to any information that represents a radio condition. Therefore, a condition for triggering a process in which the UE performs transmission of the same data with both the first base station and the second base station is enriched.

In another possible design, the method further includes:
sending, by the first base station, configuration information to the UE, where the configuration information includes information about a manner in which the UE performs data transmission with the first base station and the second base station.

In this embodiment of the present disclosure, when the first base station determines to perform transmission of the same data with both the UE and the second base station, the first base station sends configuration information to the UE, to trigger a process in which the UE performs transmission of the same data with both the first base station and the second base station. Therefore, a trigger mode is added.

In another possible design, when the first logical channel and the second logical channel each belong to a signaling radio bearer SRB, the configuration information includes a diversity mode or a split bearer.

In a possible design, when the first logical channel and the second logical channel each belong to a data radio bearer DRB, the configuration information includes a diversity bearer or a split bearer.

In another possible design, the performing, by the first base station, transmission of the to-be-transmitted data with the second base station by using an interface between the first base station and the second base station accessed by the UE includes:
sending, by the first base station, a handover request message to the second base station, where the handover request message instructs the second base station to configure the second logical channel for the UE; and
receiving, by the first base station, a handover response message sent by the second base station, and performing transmission of the to-be-transmitted data with the second base station based on the handover response message by using the interface between the first base station and the second base station accessed by the UE.

This embodiment of the present disclosure may be applied to a handover scenario, and application scenarios of this solution are added.

In another possible design, the performing, by a first base station when the first base station performs transmission of same data with both user equipment UE and a second base station accessed by the UE, transmission of data of the UE with the UE by using a first logical channel between the first base station and the UE includes:
performing, by the first base station when the first base station performs data transmission to the UE and performs transmission of the same data with both the UE and the second base station, transmission of the to-be-transmitted data of the UE with the UE by using the first logical channel; or
performing, by the first base station when the first base station receives the data transmitted by the UE and performs transmission of the same data with both the UE and the second base station, transmission of the to-be-transmitted data of the UE with the UE by using the first logical channel.

In this embodiment of the present disclosure, during uplink transmission, the first base station performs transmission of the same data with both the UE and the second base station; and during downlink transmission, the first base station may perform transmission of the same data or different data with the UE and the second base station. During downlink transmission, the first base station performs transmission of the same data with both the UE and the second base station; and during uplink transmission, the first base station may perform transmission of the same data or different data with the UE and the second base station. Therefore, same or different transmission modes may be selected based on a specific uplink or downlink condition, to improve applicability of this solution.

In another possible design, the first base station is a base station that has a radio access network central unit CU and distributed unit DU split architecture.

In this embodiment of the present disclosure, the first base station may be a conventional all-in-one base station, or may be a base station that has a radio access network CU-DU split architecture. Therefore, application scenarios of this solution are enriched.

In another possible design, a transmission mode in which the first base station performs transmission of the same data with both the UE and the second base station is a diversity transmission mode, where the diversity transmission mode includes a diversity bearer or a diversity mode.

In this embodiment of the present disclosure, the diversity transmission mode may be the diversity bearer or may be the diversity mode. Therefore, the diversity transmission mode is enriched.

According to a third aspect, an embodiment of the present disclosure provides a data transmission apparatus, where the apparatus includes:
a first transmission unit, configured to perform, when transmission of same data is performed with a first base station accessed by user equipment UE and a second base station accessed by the UE, transmission of to-be-transmitted data of the UE with the first base station by using a first logical channel between the UE and the first base station; and
a second transmission unit, configured to perform transmission of the to-be-transmitted data with the second base station by using a second logical channel between the UE and the second base station, where the first logical channel and the second logical channel are associated with a same radio bearer of the UE.

In a possible design, the apparatus further includes:
a receiving unit, configured to receive configuration information sent by the first base station, where the configuration information includes information about a manner in which the UE performs data transmission with the first base station and the second base station; and
when the configuration information includes information indicating that the UE performs transmission of the same data with both the first base station and the second base station, a first determining unit is configured to perform transmission of the same data with both the first base station and the second base station.

In another possible design, when the first logical channel and the second logical channel each belong to a signaling radio bearer SRB, the configuration information includes the information indicating that the UE performs transmission of the same data with both the first base station and the second base station, namely, a diversity mode or a split bearer.

In another possible design, when the first logical channel and the second logical channel each belong to a data radio bearer DRB, the configuration information includes the information indicating that the UE performs transmission of the same data with both the first base station and the second base station, namely, a diversity bearer or a split bearer.

In another possible design, the apparatus further includes:
a second determining unit, configured to: obtain a first radio condition of a current channel; and when the first radio condition meets a first preset condition, perform transmission of the same data with both the first base station and the second base station.

In another possible design, the first preset condition includes at least one of the following conditions:
a reference signal received power RSRP between the UE and the first base station is not greater than a first preset power, a reference signal received quality RSRQ value between the UE and the first base station is not greater than a first preset value, a channel quality indicator CQI of a radio channel between the UE and the first base station is not greater than a second preset value, a signal-to-interference-plus-noise ratio SINR of the UE is not greater than a third preset value, a signal-to-noise ratio SNR of the UE is not greater than a fourth preset value, a statistical quantity of hybrid automatic repeat request HARQ negative acknowledgements NACKs is greater than a fifth preset value, and a statistical quantity of automatic repeat request ARQ negative acknowledgements NACKs is greater than a sixth preset value.

In another possible design, the first transmission unit is further configured to perform, when the data is transmitted to the first base station and transmission of the same data is performed with the first base station and the second base station, transmission of the to-be-transmitted data of the UE with the first base station by using the first logical channel; or
the first transmission unit is further configured to perform, when the data transmitted by the first base station is received and transmission of the same data is performed with the first base station and the second base station, transmission of the to-be-transmitted data of the UE with the first base station by using the first logical channel.

In another possible design, the first base station or the second base station or both are base stations that have a radio access network central unit CU and distributed unit DU split architecture.

In another possible design, a transmission mode in which transmission of the same data is performed with the first base station and the second base station is a diversity transmission mode, where the diversity transmission mode includes a diversity bearer or a diversity mode.

According to a fourth aspect, an embodiment of the present disclosure provides a data transmission apparatus, where the apparatus includes:
a third transmission unit, configured to perform, when transmission of same data is performed with user equipment UE and a second base station accessed by the UE, transmission of to-be-transmitted data of the UE with the UE by using a first logical channel between a first base station and the UE; and
a fourth transmission unit, configured to perform transmission of the to-be-transmitted data with the second base station by using an interface between the fourth transmission unit and the second base station, so that the second base station performs transmission of the to-be-transmitted data with the UE by using a second logical channel between the second base station and the UE, where the first logical channel and the second logical channel are associated with a same radio bearer of the UE.

In a possible design, the apparatus further includes:
a third determining unit, configured to: obtain a second radio condition of a current channel; and when the second radio condition meets a second preset condition, perform transmission of the same data with both the UE and the second base station.

In another possible design, the second preset condition includes at least one of the following conditions:
a reference signal received power RSRP between the UE and the apparatus is not greater than a second preset power, a reference signal received quality RSRQ value between the UE and the apparatus is not greater than a seventh preset value, a channel quality indicator CQI of a radio channel between the UE and the apparatus is not greater than an eighth preset value, a signal-to-interference-plus-noise ratio SINR of the UE is not greater than a ninth preset value, a signal-to-noise ratio SNR of the UE is not greater than a tenth preset value, a statistical quantity of hybrid automatic repeat request HARQ negative acknowledgements NACKs is greater than an eleventh preset value, and a statistical quantity of automatic repeat request ARQ negative acknowledgements NACKs is greater than a twelfth preset value.

In another possible design, the apparatus further includes:
a sending unit, configured to send configuration information to the UE, where the configuration information includes information about a manner in which the UE performs data transmission with the apparatus and the second base station.

In another possible design, when the first logical channel and the second logical channel each belong to a signaling radio bearer SRB, the configuration information includes a diversity mode or a split bearer.

In another possible design, when the first logical channel and the second logical channel each belong to a data radio bearer DRB, the configuration information includes a diversity bearer or a split bearer.

In another possible design, the fourth transmission unit is further configured to: send a handover request message to the second base station, where the handover request message instructs the second base station to configure the second logical channel for the UE; and receive a handover response message sent by the second base station, and perform transmission of the to-be-transmitted data with the second base station based on the handover response message by using the interface between the fourth transmission unit and the second base station accessed by the UE.

In another possible design, the third transmission unit is further configured to perform, when the data is transmitted to the UE and transmission of the same data is performed with the UE and the second base station, transmission of the to-be-transmitted data of the UE with the UE by using the first logical channel; or
the third transmission unit is further configured to perform, when the data transmitted by the UE is received and transmission of the same data is performed with the UE and the second base station, transmission of the to-be-transmitted data of the UE with the UE by using the first logical channel.

In another possible design, the apparatus is a base station that has a radio access network central unit CU and distributed unit DU split architecture.

In another possible design, a transmission mode in which transmission of the same data is performed with the UE and the second base station is a diversity transmission mode, where the diversity transmission mode includes a diversity bearer or a diversity mode.

According to a fifth aspect, an embodiment of the present disclosure provides user equipment UE, where the UE includes a transceiver, a processor, a bus, and a memory, where the transceiver, the processor, and the memory communicate with each other by using the bus, the transceiver is configured for communication between the UE and a base station, and the processor executes an instruction stored in the memory, so that the UE performs the data transmission method provided in the first aspect or any possible implementation of the first aspect.

According to a sixth aspect, an embodiment of the present disclosure provides a base station, where the base station includes a transceiver, a processor, a bus, and a memory, where the transceiver, the processor, and the memory communicate with each other by using the bus, the transceiver is configured for communication between the base station and user equipment UE, and the processor executes an instruction stored in the memory, so that the base station performs the data transmission method provided in the second aspect or any possible implementation of the second aspect.

According to a seventh aspect, an embodiment of the present disclosure provides a system chip, which is applied to user equipment UE. The chip includes an input/output interface, at least one processor, a memory, and a bus, where the input/output interface is connected to the at least one processor and the memory by using the bus, the input/output interface is used for communication between the UE and a base station, and the at least one processor executes an instruction stored in the memory, so that the UE performs the data transmission method provided in the first aspect or any possible implementation of the first aspect.

According to an eighth aspect, an embodiment of the present disclosure provides a system chip, which is applied to a base station. The chip includes an input/output interface, at least one processor, a memory, and a bus, where the input/output interface is connected to the at least one processor and the memory by using the bus, the input/output interface is used for communication between the base station and user equipment UE, and the at least one processor executes an instruction stored in the memory, so that the base station performs the data transmission method provided in the second aspect or any possible implementation of the second aspect.

According to a ninth aspect, an embodiment of the present disclosure provides a computer storage medium, configured to store a computer software instruction used by UE, where the computer software instruction includes a program that is designed for the UE and that is used for executing the foregoing aspect.

According to a tenth aspect, an embodiment of the present disclosure provides a computer storage medium, configured to store a computer software instruction used by a first base station, where the computer software instruction includes a program that is designed for the first base station and that is used for executing of the foregoing aspect.

Technical effects obtained according to the second to tenth aspects of the embodiments of the present disclosure are similar to the technical effects obtained by using the technical means corresponding to the first aspect, and details are not described herein again.

In conclusion, beneficial effects brought by the technical solutions provided in the embodiments of the present disclosure are as follows:

In the embodiments of the present disclosure, the UE performs transmission of the to-be-transmitted data of the UE with the first base station by using the first logical channel, and performs transmission of the to-be-transmitted data with the second base station by using the second logical channel, so that the second base station forwards the to-be-transmitted data to the first base station. The UE performs transmission of the same data by using the first logical channel and the second logical channel. Therefore, reliability of a radio link is improved, and a latency of data transmission is reduced.

DESCRIPTION OF EMBODIMENTS

To make the objectives, technical solutions, and advantages of the present disclosure clearer, the following further describes the implementations of the present disclosure in detail with reference to the accompanying drawings.

Embodiments of the present disclosure are mainly applied to a high-frequency cell scenario, an ultra-reliable and low-latency communications (URLLC) scenario, or another scenario that has relatively high requirements on reliability and a latency of a radio link, for example, a handover scenario. When a radio condition of a logical channel is poor, a data transmission failure may be caused. In this case, relying on retransmission for recovery may cause a higher data transmission latency, or the retransmission still fails when the radio condition is still poor. In the embodiments of the present disclosure, transmission of same data is performed by using two logical channels, reliability of a radio link is improved, and a latency of data transmission is reduced.

Figure 1:
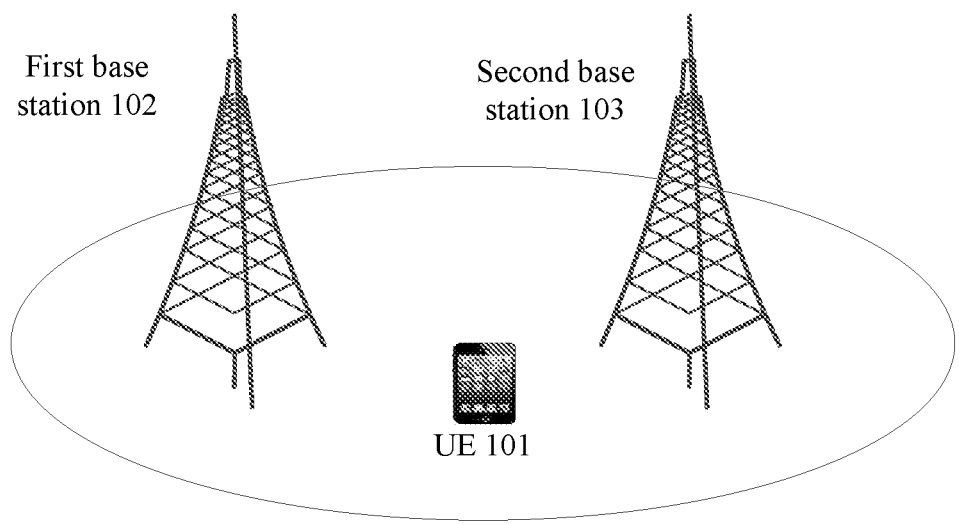
FIG. 1 is a system architectural diagram of data transmission according to an embodiment of the present disclosure.

Referring to FIG. 1, an embodiment of the present disclosure provides a system architecture of data transmission. The system architecture includes UE 101, a first base station 102, and a second base station 103. The UE 101 simultaneously accesses the first base station 102 and the second base station 103. The first base station 102 may be a primary base station, and the second base station 103 may be a secondary base station. Certainly, the second base station 103 may be a primary base station, and the first base station 102 may be a secondary base station. In this embodiment of the present disclosure, roles of the first base station 102 and the second base station 103 are not specifically limited. In this embodiment of the present disclosure, that the first base station 102 is the primary base station and the second base station 103 is a secondary base station is used as an example for description.

When data is transmitted between the UE 101 and the first base station 102, to reduce a transmission latency, the data is transmitted between the UE 101 and the first base station 102 and between the UE 101 and the second base station 103 in a diversity transmission mode. To improve transmission efficiency, transmission of data may alternatively be performed between the UE 101 and the first base station 102 and between the UE 101 and the second base station 103 in a split transmission mode.

The diversity transmission mode means that transmission of same data is performed by using a first logical channel between the UE 101 and the first base station 102 and by using a second logical channel between the UE 101 and the second base station 103. The split transmission mode means that transmission of different data is performed by using the first logical channel and the second logical channel. The transmitted data may be radio resource control (RRC) signaling or user data.

The first logical channel and the second logical channel are both associated with a same radio bearer of the UE 101, that is, the first logical channel and the second logical channel both belong to the same radio bearer of the UE 101. The radio bearer is a radio logical resource for transmitting data between UE and a base station. The first logical channel and the second logical channel are respectively established between the UE and a first cell (or a first cell group) provided by the first base station and between the UE and a second cell (or a second cell group) provided by the second base station. The first logical channel and the second logical channel are connected to a same Packet Data Convergence Protocol (PDCP). When the transmitted data is the RRC signaling, each of a type of the first logical channel and a type of the second logical channel is a signaling radio bearer (SRB). When the transmitted data is the user data, each of a type of the first logical channel and a type of the second logical channel is a data radio bearer (DRB).

Before data transmission, the first logical channel between the UE 101 and the first base station 102 and the second logical channel between the UE 101 and the second base station 103 are established. During establishment of the first logical channel and the second logical channel, a DRB type is configured as a diversity bearer or a split bearer; or an existing split radio bearer is configured as a diversity mode or a split mode. The SRB is configured as a diversity bearer or a split bearer. Alternatively, the SRB is configured as a diversity mode or a split mode. Therefore, the diversity transmission mode includes a diversity bearer or a diversity mode, and the split transmission mode includes a split bearer or a split mode.

The data transmission method provided in this embodiment of the present disclosure may be applied to a conventional all-in-one base station, or may be applied to a base station that has a radio access network central unit (CU) and distributed unit (DU) split architecture. Therefore, the first base station 102 may be a conventional all-in-one base station, or may be a base station that has a radio access network CU-DU split architecture. The second base station 103 may be a conventional all-in-one base station, or may be a base station that has a radio access network CU-DU split architecture. The conventional all-in-one base station is a base station in which protocol layers of a radio interface or an air interface are located in a same radio access network node. The base station that has the radio access network CU-DU split architecture is a base station in which protocol layers of a radio interface may be located in different radio access network nodes. The different radio access network nodes may be a CU and a DU.

The first base station 102 includes a first RRC 1021, a first PDCP 1022, a first radio link control (RLC) protocol 1023, a first Media Access Control (MAC) protocol 1024, and a first physical layer (PHY) 1025. Some units in the first base station 102 are located in a first CU, remaining units in the first base station 102 are located in a first DU, and the first base station 102 may include one or more first DUs. The first CU and the first DU are connected by using a line link (for example, an optical fiber) or a radio link. The unit located in the first CU and the unit located in the first DU may be flexibly deployed based on a radio condition between the first DU and the UE 101, different UEs 101, different radio bearers of the UE 101, or the like. The first DU instructs the first CU to perform data transmission with the UE 101 in the diversity transmission mode.

Figure 2:
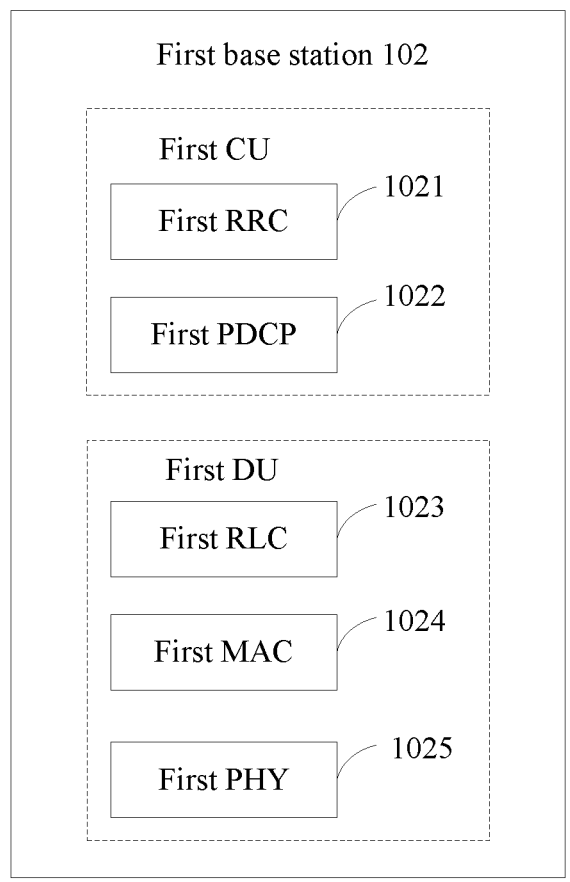
FIG. 2 is a schematic structural diagram of a first base station according to an embodiment of the present disclosure.

For example, the first RRC 1021 is located in the first CU, and the first PDCP 1022, the first RLC 1023, the first MAC 1024, and the first PHY 1025 are located in the first DU. Alternatively, referring to FIG. 2, the first RRC 1021 and the first PDCP 1022 are located in the first CU, and the first RLC 1023, the first MAC 1024, and the first PHY 1025 are located in the first DU. Alternatively, the first RRC 1021, the first PDCP 1022, and the first RLC 1023 are located in the first CU, and the first MAC 1024 and the first PHY 1025 are located in the first DU. Alternatively, the first RRC 1021, the first PDCP 1022, the first RLC 1023, and the first MAC 1024 are located in the first CU, and the first PHY 1025 is located in the first DU. For the first base station 102, protocol split manners between the first CU and the plurality of first DUs may be different.

Likewise, the second base station 103 includes a second RRC 1031, a second PDCP 1032, a second RLC 1033, a second MAC 1034, and a second PHY 1035. Some units in the second base station 103 are located in the second CU, remaining units in the second base station 103 are located in the second DU, and the second base station 103 may include one or more second DUs. The second CU and the second DU are connected by using a line link or a radio link. The unit located in the second CU and the unit located in the second DU may be flexibly deployed based on a radio condition between the second DU and the UE 101, different UEs 101, different radio bearers of the UE 101, or the like. The second DU instructs the second CU to perform data transmission with the UE 101 in the diversity transmission mode.

For example, the second RRC 1031 is located in the second CU, and the second PDCP 1032, the second RLC 1033, the second MAC 1034, and the second PHY 1035 are located in the second DU. Alternatively, the second RRC 1031 and the second PDCP 1032 are located in the second CU, and the second RLC 1033, the second MAC 1034, and the second PHY 1035 are located in the second DU. Alternatively, the second RRC 1031, the second PDCP 1032, and the second RLC 1033 are located in the second CU, and the second MAC 1034 and the second PHY 1035 are located in the second DU. Alternatively, the second RRC 1031, the second PDCP 1032, the second RLC 1033, and the second MAC 1034 are located in the second CU, and the second PHY 1035 is located in the second DU. For the second base station 103, protocol split manners between the second CU and the plurality of second DUs may be different.

The first RRC 1021 (or the second RRC 1031) is configured to perform data broadcasting, paging, RRC connection management, security management, bearer management, and mobility management. The first PDCP 1022 (or the second PDCP 1032) is configured to perform header compression and security functions. For example, the first PDCP 1022 (or the second PDCP 1032) is configured to perform encryption, decryption, integrity protection, verification, or the like on transmitted data. The first RLC 1023 (or the second RLC 1033) is configured to perform segmentation, concatenation, reordering, or the like on ARQ information. The first MAC 1024 (or the second MAC 1034) is configured to perform data scheduling, priority processing, and the like. The first PHY 1025 (or the second PHY 1035) is used for processing of waveform and multiple access, modulation, encoding, decoding, mapping of data information to radio resources, and the like.

The first base station 102 and the second base station 103 may be Long Term Evolution (LTE) systems or future communications systems. The first base station 102 and the second base station 103 may provide low frequency cells, high frequency cells, unlicensed spectrum cells, or the like. For example, the first base station 102 and the second base station 103 may be base stations of the 5th Generation (5G) mobile communications technology. The UE 101 may be an LTE terminal or a next generation terminal. For example, the UE 101 may be a 5G terminal.

Figure 3:
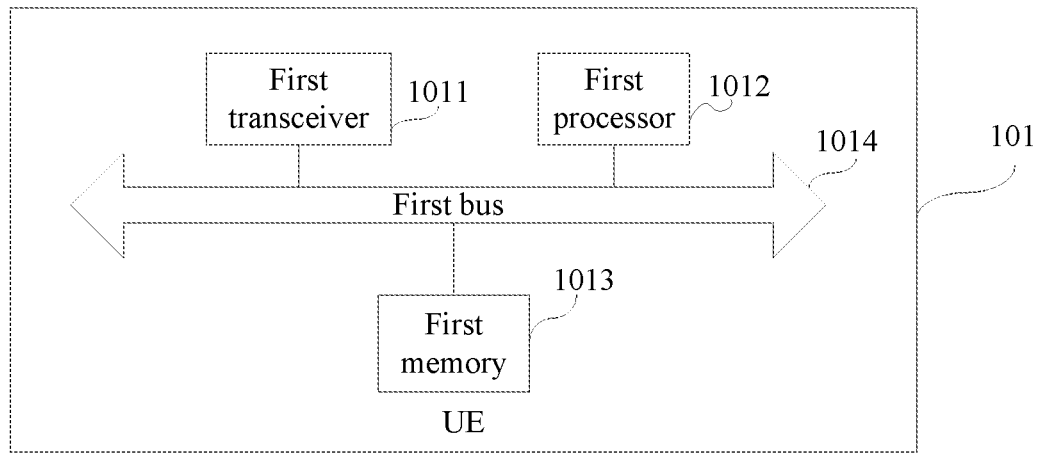
FIG. 3 is a schematic structural diagram of UE according to an embodiment of the present disclosure.

FIG. 3 shows UE 101 according to an embodiment of the present disclosure. The UE 101 includes a first transceiver 1011, a first processor 1012, a first memory 1013, and a first bus 1014. The first transceiver 1011, the first processor 1012, and the first memory 1013 communicate with each other by using the first bus 1014. The first transceiver 1011 is used for communication between the UE 101 and a first base station 102. The first memory 1013 is configured to store an instruction, where the instruction includes a computer operation instruction. The first processor 1012 executes the instruction stored in the first memory 1013, so that the UE 101 performs a data transmission method described below.

Figure 4:
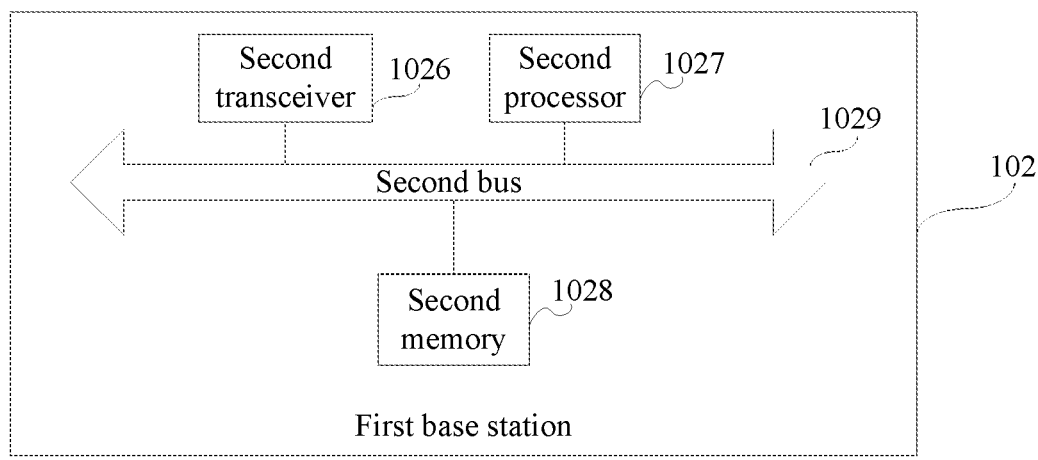
FIG. 4 is a schematic structural diagram of another first base station according to an embodiment of the present disclosure.

FIG. 4 shows a first base station 102 according to an exemplary embodiment of the present disclosure. The first base station 102 includes a second transceiver 1026, a second processor 1027, a second memory 1028, and a second bus 1029. The second transceiver 1026, the second processor 1027, and the second memory 1028 communicate with each other by using the second bus 1029. The second transceiver 1026 is configured for communication between the first base station 102 and UE 101. The second memory 1028 is configured to store an instruction, where the instruction includes a computer operation instruction. The second processor 1027 executes the instruction stored in the second memory 1028, so that the first base station 102 performs a data transmission method described below.

Figure 5:
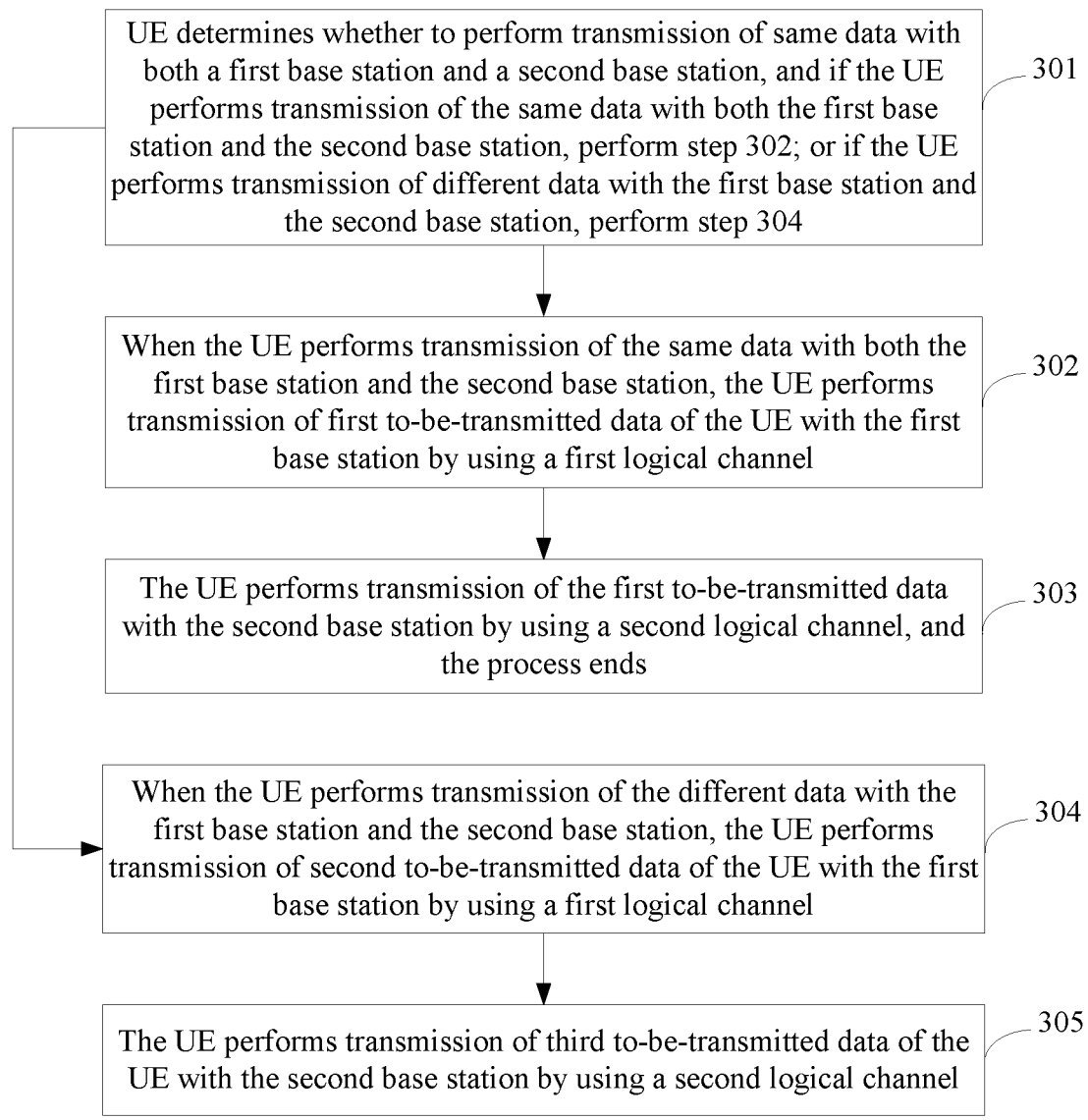
FIG. 5 is a flowchart of a data transmission method according to an embodiment of the present disclosure.

An embodiment of the present disclosure provides a data transmission method. The method is applied between UE, a first base station, and a second base station. When each of the first base station and the second base station is a base station that has a radio access network CU-DU split architecture, and each of the first base station and the second base station includes two DUs, the present disclosure is applied between UE, a first CU and two first DUs of the first base station, and a second CU and two second DUs of the second base station. In this embodiment of the present disclosure, two base stations or a CU and two DUs of a base station are used as an example for description. No specific limitation is imposed on the present disclosure. It may be understood that this embodiment of the present disclosure is also applicable to diversity transmission or split transmission between more base stations or between a CU and more DUs of a base station. Referring to FIG. 5, the method includes the following steps.

Step 301: The UE determines whether to perform transmission of same data with both the first base station and the second base station, and if the UE performs transmission of the same data with both the first base station and the second base station, perform step 302; or if the UE performs transmission of different data with the first base station and the second base station, perform step 304.

The step that the UE determines whether to perform transmission of same data with both the first base station and the second base station may be implemented by using the following first to third implementations. For a first implementation, the UE determines, based on a radio condition of a current channel, whether to perform transmission of the same data with both the first base station and the second base station. For a second implementation, the first base station determines, based on a radio condition of a current channel, whether the UE performs transmission of the same data with both the first base station and the second base station, and notifies the UE of a result of the determining by using configuration information. For a third implementation, the second base station determines, based on a radio condition of a current channel, whether the UE performs transmission of the same data with both the first base station and the second base station, and notifies the UE of a result of the determining by using configuration information. When a first logical channel and a second logical channel each belong to an SRB, and the result of the determining is that the UE performs transmission of the same data with both the first base station and the second base station, the configuration information includes a diversity mode or a split bearer, where the diversity mode or the split bearer is used to indicate that the UE performs transmission of the same data with both the first base station and the second base station. When the first logical channel and the second logical channel each belong to a DRB, and the result of the determining is that the UE performs transmission of the same data with both the first base station and the second base station, the configuration information includes a diversity bearer or a split bearer, where the diversity bearer or the split bearer is used to indicate that the UE performs transmission of the same data with both the first base station and the second base station.

For the first implementation, this step may be as follows:

The UE obtains a first radio condition of the current channel, and when the first radio condition meets a first preset condition, the UE performs transmission of the same data with both the first base station and the second base station; or when the first radio condition meets a third preset condition, the UE performs transmission of different data with the first base station and the second base station.

The first radio condition may be at least one of the following conditions:

a reference signal received power (RSRP) between the UE and the first base station, a reference signal received quality (RSRQ) value between the UE and the first base station, a channel quality indicator (CQI) of a radio channel between the UE and the first base station, a signal-to-interference-plus-noise ratio (SINR) of the UE, a signal-to-noise ratio (SNR) of the UE, a statistical quantity of hybrid automatic repeat request negative acknowledgements (HARQ NACK), and a statistical quantity of automatic repeat request negative acknowledgements (ARQ NACK).

When the first radio condition is the statistical quantity of HARQ NACKs, to improve accuracy of the determining, the UE may collect statistics about a quantity of HARQ NACKs that are sent by the UE to the first base station (or the second base station) in a first preset duration that is closest to a current time, or the UE collects statistics about a quantity of HARQ NACKs that are received by the UE and sent by the first base station (or the second base station) in a first preset duration that is closest to a current time.

Likewise, when the first radio condition is the statistical quantity of ARQ NACKs, to improve accuracy of the determining, the UE may collect statistics about a quantity of ARQ NACKs that are sent by the UE to the first base station (or the second base station) in a first preset duration that is closest to a current time, or the UE collects statistics about a quantity of ARQ NACKs that are received by the UE and sent by the first base station (or the second base station) in a first preset duration that is closest to a current time.

The first preset duration may be set and changed as required. In this embodiment of the present disclosure, the first preset duration is not specifically limited. For example, the first preset duration may be 5 hours, 8 hours, or the like.

Correspondingly, the first preset condition may be at least one of the following conditions:

An RSRP is not greater than a first preset power, an RSRQ value is not greater than a first preset value, a CQI is not greater than a second preset value, an SINR is not greater than a third preset value, an SNR is not greater than a fourth preset value, a statistical quantity of HARQ NACKs is greater than a fifth preset value, and a statistical quantity of ARQ NACKs is greater than a sixth preset value.

The third preset condition may be at least one of the following conditions:

An RSRP is greater than a first preset power and less than a third preset power, an RSRQ value is greater than a first preset value and less than a thirteenth preset value, a CQI is greater than a second preset value and less than a fourteenth preset value, an SINR is greater than a third preset value and less than a fifteenth preset value, an SNR is greater than a fourth preset value and less than a sixteenth preset value, a statistical quantity of HARQ NACKs is greater than a seventeenth preset value and not greater than a fifth preset value, and a statistical quantity of ARQ NACKs is greater than an eighteenth preset value and not greater than a sixth preset value.

The third preset power is greater than the first preset power, the thirteenth preset value is greater than the first preset value, the fourteenth preset value is greater than the second preset value, the fifteenth preset value is greater than the third preset value, the sixteenth preset value is greater than the fourth preset value, the seventeenth preset value is less than the fifth preset value, and the eighteenth preset value is less than the sixth preset value. In addition, the first preset power, the third preset power, the first preset value, the second preset value, the third preset value, the fourth preset value, the fifth preset value, the sixth preset value, the thirteenth preset value, the fourteenth preset value, the fifteenth preset value, the sixteenth preset value, the seventeenth preset value, and the eighteenth preset value may be set and changed as required. In this embodiment of the present disclosure, the first preset power, the first preset value, the second preset value, the third preset value, the fourth preset value, the fifth preset value, and the sixth preset value are not specifically limited.

For the second implementation, this step may be as follows:

The first base station obtains a second radio condition of the current channel; and when the second radio condition meets a second preset condition, the first base station determines to perform transmission of the same data with both the UE and the second base station, and sends, to the UE, configuration information (for ease of distinction, the configuration information is referred to as first configuration information) that includes information indicating that the UE performs transmission of the same data with both the first base station and the second base station, to trigger a process in which the UE performs transmission of the same data with both the first base station and the second base station. The UE receives the first configuration information sent by the first base station, and determines that the UE performs transmission of the same data with both the first base station and the second base station when the first configuration information includes the information indicating that the UE performs transmission of the same data with both the first base station and the second base station.

When the second radio condition meets a fourth preset condition, the first base station determines to perform transmission of different data with the UE and the second base station, and sends, to the UE, second configuration information that includes information indicating that the UE performs transmission of the different data with the first base station and the second base station. The UE receives the second configuration information sent by the first base station, and determines that the UE performs transmission of the different data with the first base station and the second base station when the second configuration information includes the information indicating that the UE performs transmission of the different data with the first base station and the second base station.

It should be noted that the first base station may directly send the first configuration information to the UE, or may send the first configuration information to the second base station, and the second base station forwards the first configuration information to the UE. Likewise, the first base station may directly send the second configuration information to the UE, or may send the second configuration information to the second base station, and the second base station forwards the second configuration information to the UE.

The second radio condition may be at least one of the following conditions:

an RSRP between the UE and the first base station, an RSRQ value between the UE and the first base station, a CQI of a radio channel between the UE and the first base station, an SINR of the UE, an SNR of the UE, a statistical quantity of HARQ NACKs, and a statistical quantity of ARQ NACKs.

When the second radio condition is the RSRP and/or the CQI, the UE sends a measurement report to the first base station periodically or when a report condition is met, where the measurement report includes the RSRP and/or the CQI. The first base station receives the measurement report reported by the UE, and obtains the RSRP and/or the CQI from the measurement report.

It should be noted that when the UE sends the measurement report to the first base station, the UE may send the measurement report to a first MAC included in the first base station. Correspondingly, the first MAC receives the measurement report sent by the UE. Therefore, the first MAC determines, based on the measurement report, whether the UE performs transmission of the same data with both the first base station and the second base station.

Figure 6:
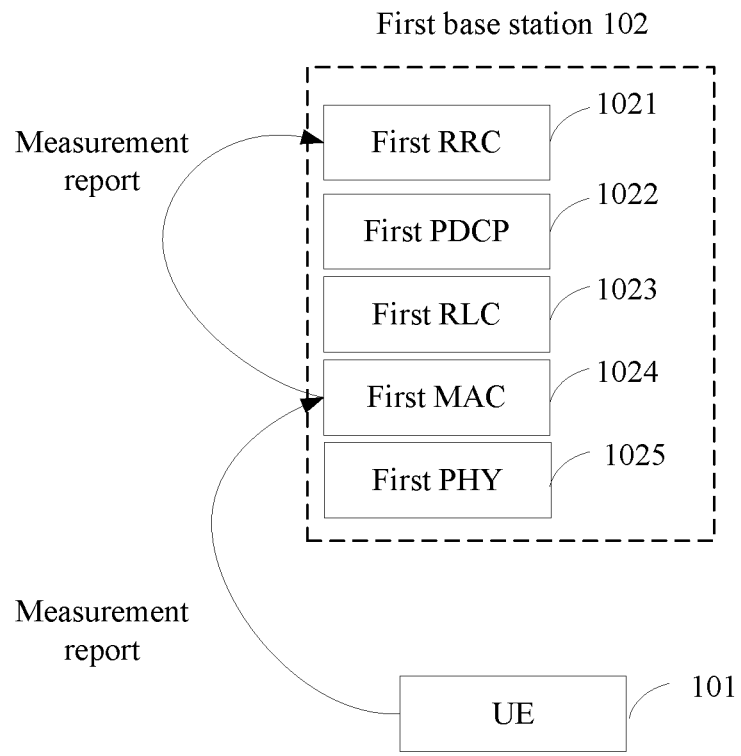
FIG. 6 is a schematic diagram of a measurement report of transmission between UE and a first base station according to an embodiment of the present disclosure.

Further, after receiving the measurement report, the first MAC may send the measurement report to a first RRC. The first RRC determines, based on the measurement report, whether the UE performs transmission of the same data with both the first base station and the second base station. Refer to FIG. 6.

When the radio condition is the statistical quantity of HARQ NACKs and/or the statistical quantity of ARQ NACKs, when the UE fails to receive data transmitted by the first base station, the UE sends an RLC status report to the first base station, where the RLC status report includes the statistical quantity of HARQ NACKs and/or the statistical quantity of ARQ NACKs. The first base station receives the RLC status report sent by the UE, and obtains the statistical quantity of HARQ NACKs and/or the statistical quantity of ARQ NACKs from the RLC status report.

It should be noted that when the UE sends the RLC status report to the first base station, the UE may send the RLC status report to a first RLC included in the first base station. Correspondingly, the first RLC receives the RLC status report sent by the UE. Therefore, the first RLC determines, based on the RLC status report, whether the UE performs transmission of the same data with both the first base station and the second base station.

Likewise, when the second radio condition is the statistical quantity of HARQ NACKs, to improve accuracy of the determining, the first base station may collect statistics about a quantity of HARQ NACKs that are sent by the first base station to the UE (or the second base station) in a second preset duration that is closest to a current time, or the first base station collects statistics about a quantity of HARQ NACKs that are received by the first base station and sent by the UE (or the second base station) in a second preset duration that is closest to a current time.

Likewise, when the second radio condition is the statistical quantity of ARQ NACKs, to improve accuracy of the determining, the first base station may collect statistics about a quantity of ARQ NACKs that are sent by the first base station to the UE (or the second base station) in a second preset duration that is closest to a current time, or the first base station collects statistics about a quantity of ARQ NACKs that are received by the first base station and sent by the UE (or the second base station) in a second preset duration that is closest to a current time.

The second preset duration may be set and changed as required. In this embodiment of the present disclosure, the second preset duration is not specifically limited. For example, the second preset duration may be 5 hours, 8 hours, or the like.

The second preset condition may be at least one of the following conditions:

An RSRP is not greater than a second preset power, an RSRQ value is not greater than a seventh preset value, a CQI is not greater than an eighth preset value, an SINR is not greater than a ninth preset value, an SNR is not greater than a tenth preset value, a statistical quantity of HARQ NACKs is greater than an eleventh preset value, and a statistical quantity of ARQ NACKs is greater than a twelfth preset value.

The fourth preset condition may be at least one of the following conditions:

An RSRP is greater than a second preset power and less than a fourth preset power, an RSRQ value is greater than a seventh preset value and less than a nineteenth preset value, a CQI is greater than an eighth preset value and less than a twentieth preset value, an SINR is greater than a ninth preset value and less than a twenty-first preset value, an SNR is greater than a tenth preset value and less than a twenty-second preset value, a statistical quantity of HARQ NACKs is greater than a twenty-third preset value and not greater than an eleventh preset value, and a statistical quantity of ARQ NACKs is greater than a twenty-fourth preset value and not greater than a twelfth preset value.

The fourth preset power is greater than the second preset power, the nineteenth preset value is greater than the seventh preset value, the twentieth preset value is greater than the eighth preset value, the twentieth preset value is greater than the ninth preset value, the twenty-first preset value is greater than the tenth preset value, the twenty-second preset value is greater than the tenth preset value, the twenty-third preset value is less than the eleventh preset value, and the twenty-fourth preset value is less than the twelfth preset value.

For the third implementation, this step may be as follows:

The second base station obtains a third radio condition of the current channel; and when the third radio condition meets a fifth preset condition, the second base station determines to perform transmission of the same data with both the UE and the first base station, and sends, to the UE, third configuration information that includes information indicating that the UE performs transmission of the same data with both the first base station and the second base station, to trigger a process in which the UE performs transmission of the same data with both the first base station and the second base station. The UE receives the third configuration information sent by the second base station, and determines that the UE performs transmission of the same data with both the first base station and the second base station when the third configuration information includes the information indicating that the UE performs transmission of the same data with both the first base station and the second base station.

When the second radio condition meets a sixth preset condition, the second base station determines to perform transmission of different data with the UE and the first base station, and sends, to the UE, fourth configuration information that includes information indicating that the UE performs transmission of the different data with the first base station and the second base station. The UE receives the fourth configuration information sent by the second base station, and determines that the UE performs transmission of the different data with the first base station and the second base station when the fourth configuration information includes the information indicating that the UE performs transmission of the different data with the first base station and the second base station.

It should be noted that the second base station may directly send the third configuration information or the fourth configuration information to the UE, or may send the third configuration information or the fourth configuration information to the first base station, and the first base station forwards the third configuration information or the fourth configuration information to the UE.

It should be noted that when the UE determines to perform transmission of the same data or the different data with the first base station and the second base station, a third MAC or a third RLC included in the UE indicates that a third RRC or a third PDCP included in the UE performs transmission of the same data or the different data with and the first base station and the second base station.

It should be noted that before the UE performs data transmission to the first base station, the UE determines whether to perform transmission of the same data with both the first base station and the second base station; and before the UE receives the data transmitted by the first base station, the UE also needs to determine whether to perform transmission of same data with both the first base station and the second base station.

Step 302: When the UE performs transmission of the same data with both the first base station and the second base station, the UE performs transmission of to-be-transmitted data (for ease of distinction, the to-be-transmitted data herein is referred to as first to-be-transmitted data) of the UE with the first base station by using a first logical channel.

When the UE determines to perform transmission of the same data with both the first base station and the second base station during uplink transmission, the UE transmits the first to-be-transmitted data of the UE to the first base station by using the first logical channel, and the first base station receives, by using the first logical channel, the first to-be-transmitted data of the UE transmitted by the UE. The UE may perform transmission of same or different data with the first base station and the second base station during downlink transmission.

When the UE determines to perform transmission of the same data with both the first base station and the second base station during downlink transmission, the first base station transmits the first to-be-transmitted data of the UE to the UE by using the first logical channel, and the UE receives, by using the first logical channel, the first to-be-transmitted data of the UE transmitted by the first base station. The UE may perform transmission of same or different data with the first base station and the second base station during uplink transmission.

The first to-be-transmitted data may be user data, an RRC signaling RRC message, a PDCP PDL message, a MAC PDU message, or data obtained after code modulation at a physical layer.

It should be noted that before this step, the UE establishes the first logical channel between the UE and the first base station and establishes the second logical channel between the UE and the second base station.

The UE performs data transmission with the first base station by establishing the first logical channel on a first DU included in the first base station.

Step 303: The UE performs transmission of the first to-be-transmitted data with the second base station by using a second logical channel, and the process ends.

When the UE determines to perform transmission of the same data with both the first base station and the second base station during uplink transmission, the UE transmits the first to-be-transmitted data to the second base station by using the second logical channel. The second base station receives, by using the second logical channel, the first to-be-transmitted data transmitted by the UE, and transmits the first to-be-transmitted data to the first base station by using an interface between the second base station and the first base station. The UE may perform transmission of same or different data with the first base station and the second base station during downlink transmission.

When the UE determines to perform transmission of the same data with both the first base station and the second base station during downlink transmission, the first base station transmits the first to-be-transmitted data to the second base station by using an interface between the first base station and the second base station. The second base station receives, by using the interface between the first base station and the second base station, the first to-be-transmitted data transmitted by the first base station, and transmits the first to-be-transmitted data to the UE by using the second logical channel. The UE receives, by using the second logical channel, the first to-be-transmitted data transmitted by the second base station. The UE may perform transmission of same or different data with the first base station and the second base station during uplink transmission.

Before this step, an interface needs to be established between the first base station and the second base station. For example, the interface may be an X2 interface, or may be another interface on a base station, or may be an interface evolved on a basis of an X2 interface. In this embodiment of the present disclosure, an interface between base stations is not specifically limited.

Figure 7:
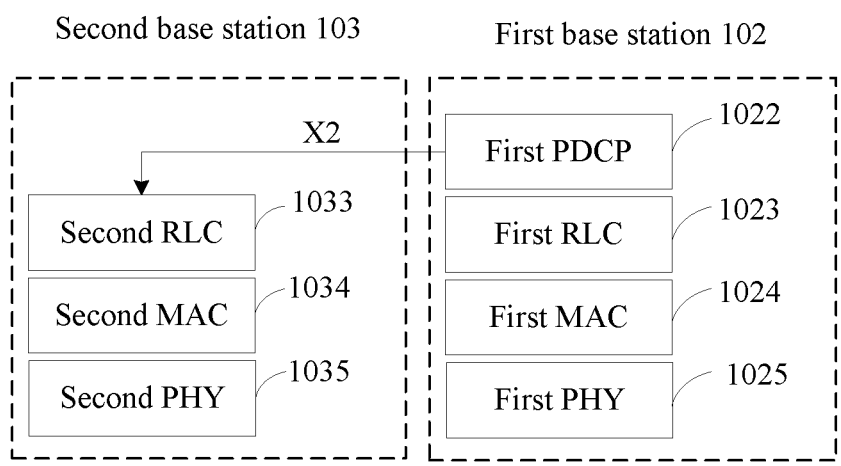
FIG. 7 is a schematic structural diagram of a user plane protocol stack between a first base station and a second base station according to an embodiment of the present disclosure.
Figure 8:
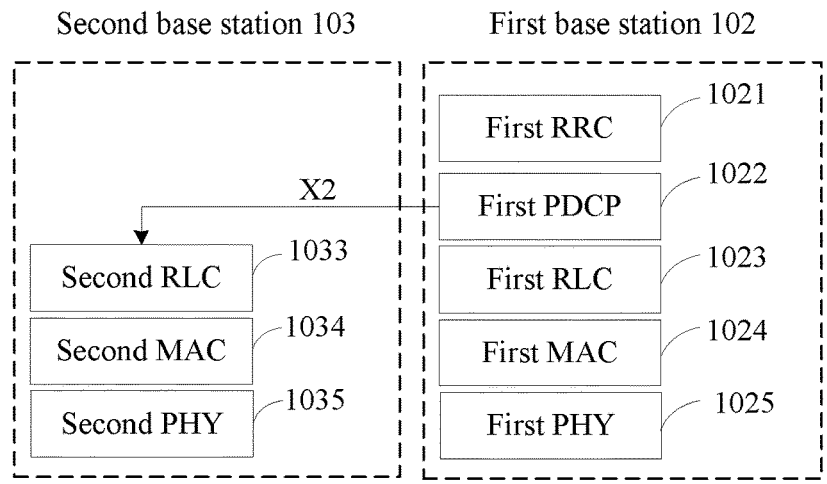
FIG. 8 is a schematic structural diagram of a control plane protocol stack between a first base station and a second base station according to an embodiment of the present disclosure.

For example, referring to FIG. 7, an embodiment of the present disclosure provides a user plane protocol stack between the first base station and the second base station, and referring to FIG. 8, an embodiment of the present disclosure provides a control plane protocol stack between the first base station and the second base station. A first PDCP in the first base station establishes a connection with a second RLC in the second base station by using the X2 interface. Therefore, data transmission is performed by using the interface.

It should be noted that the second logical channel between UE and the second base station may be established in advance, or the second logical channel may be established during data transmission.

Step 304: When the UE performs transmission of the different data with the first base station and the second base station, the UE performs transmission of second to-be-transmitted data of the UE with the first base station by using a first logical channel.

During uplink transmission, the UE transmits the second to-be-transmitted data of the UE to the first base station by using the first logical channel, and the first base station receives, by using the first logical channel, the second to-be-transmitted data of the UE transmitted by the UE. During downlink transmission, the first base station transmits the second to-be-transmitted data of the UE to the UE by using the first logical channel, and the UE receives, by using the first logical channel, the second to-be-transmitted data of the UE transmitted by the first base station. The second to-be-transmitted data may be user data, an RRC signaling RRC message, a PDCP PDL message, a MAC PDU message, or data obtained after code modulation at a physical layer.

It should be noted that when the UE performs transmission of data (the first to-be-transmitted data or the second to-be-transmitted data) with the first base station, data transmission is performed by using the first logical channel and a radio interface between the UE and the first base station.

Step 305: The UE performs transmission of third to-be-transmitted data of the UE with the second base station by using a second logical channel.

During uplink transmission, the UE transmits the third to-be-transmitted data of the UE to the second base station by using the second logical channel, and the second base station receives, by using the second logical channel, the third to-be-transmitted data of the UE transmitted by the UE, and transmits the third to-be-transmitted data to the first base station by using the interface between the first base station and the second base station. The third to-be-transmitted data may be user data, an RRC signaling RRC message, a PDCP PDL message, a MAC PDU message, or data obtained after code modulation at a physical layer.

During downlink transmission, the first base station transmits the third to-be-transmitted data to the second base station by using the interface between the first base station and the second base station, the second base station receives, by using the interface between the first base station and the second base station, the third to-be-transmitted data transmitted by the first base station, and transmits the third to-be-transmitted data of the UE to the UE by using the second logical channel, and the UE receives, by using the second logical channel, the third to-be-transmitted data of the UE transmitted by the second base station. The third to-be-transmitted data may be user data, an RRC signaling RRC message, a PDCP PDL message, a MAC PDU message, or data obtained after code modulation at a physical layer.

It should be noted that when the first base station performs transmission of data (the first to-be-transmitted data or the third to-be-transmitted data) with the second base station, the first PDCP included in the first base station sends the data to the second RLC included in the second base station, or the second RLC included in the second base station sends the data to the first PDCP included in the first base station. In addition, when the UE performs transmission of data (the first to-be-transmitted data or the third to-be-transmitted data) with the second base station, data transmission is performed by using the second logical channel and a radio interface between the UE and the second base station.

In this embodiment of the present disclosure, when the UE performs transmission of the same data with both the first base station and the second base station, the UE performs transmission of the first to-be-transmitted data of the UE with the first base station by using the first logical channel between the UE and the first base station, and performs transmission of the first to-be-transmitted data with the second base station by using the second logical channel between the UE and the second base station, so that the second base station forwards the first to-be-transmitted data to the first base station. Transmission of the same data is performed with the UE by using the first logical channel and the second logical channel. Therefore, reliability of a radio link is improved, and a latency of data transmission is reduced.

Figure 9:
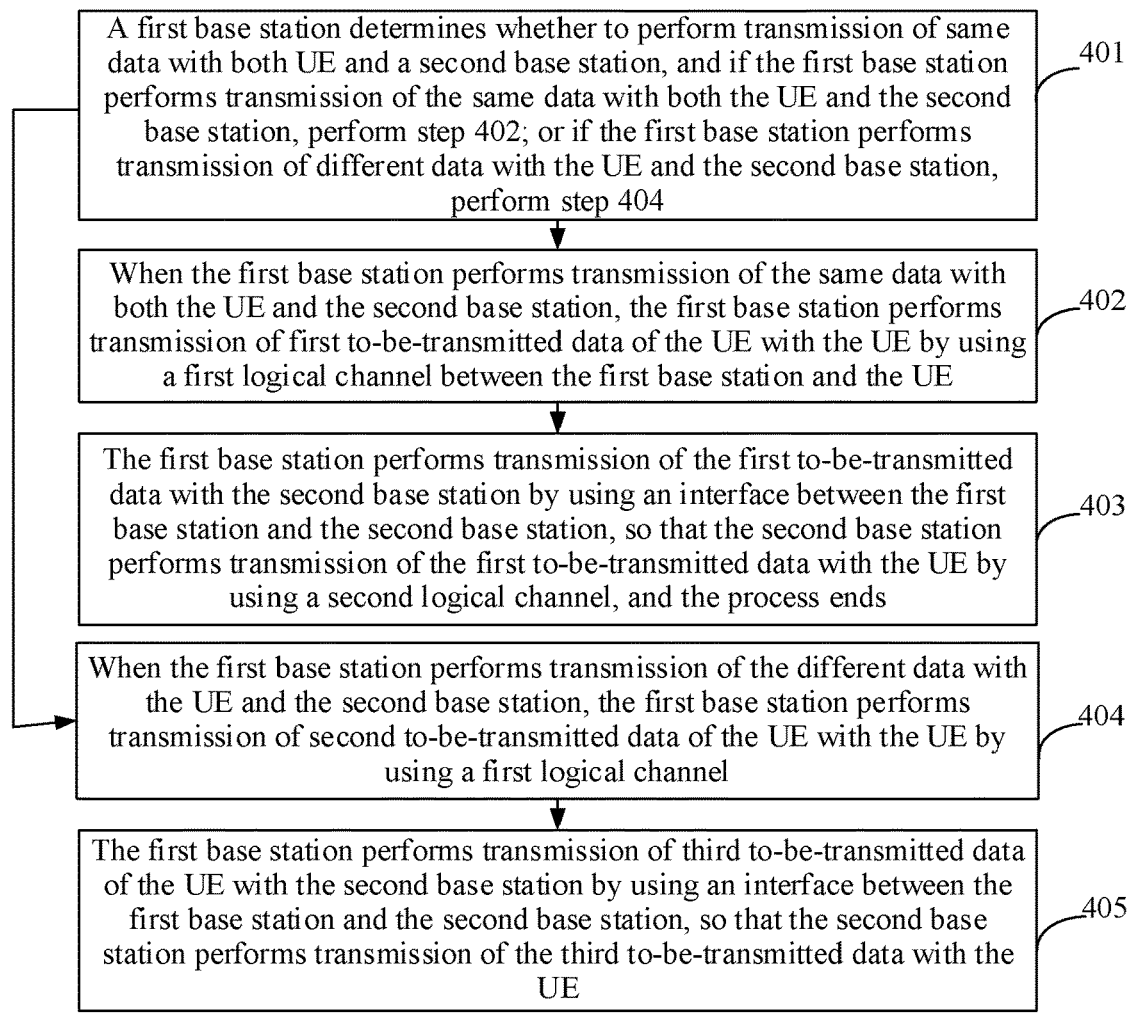
FIG. 9 is a flowchart of another data transmission method according to an embodiment of the present disclosure.

An embodiment of the present disclosure provides a data transmission method. The method is applied between UE, a first base station, and a second base station. Referring to FIG. 9, the method includes the following steps.

Step 401: The first base station determines whether to perform transmission of same data with both the UE and the second base station. If the first base station performs transmission of the same data with both the UE and the second base station, perform step 402, and if the first base station performs transmission of different data with the UE and the second base station, perform step 404.

This step is the same as the second implementation in step 301, and details are not described herein again.

Further, after the first base station determines to perform transmission of the same data with both the UE and the second base station, the first base station sends first configuration information to the UE, where the first configuration information is used to trigger a process in which the UE performs transmission of the same data with both the first base station and the second base station. It should be noted that in this step, a first MAC included in the first base station sends the first configuration information to the UE.

Step 402: When the first base station performs transmission of the same data with both the UE and the second base station, the first base station performs transmission of first to-be-transmitted data of the UE with the UE by using a first logical channel between the first base station and the UE.

Step 403: The first base station performs transmission of the first to-be-transmitted data with the second base station by using an interface between the first base station and the second base station, so that the second base station performs transmission of the first to-be-transmitted data with the UE by using a second logical channel, and the process ends.

This embodiment of the present disclosure may be applied to a handover scenario. When the first base station is switched to the second base station, this step may be implemented by the following steps 4031 and 4032, including:

4031. The first base station sends a handover request message to the second base station, where the handover request message instructs the second base station to configure the second logical channel for the UE.

The second base station receives the handover request message sent by the first base station, establishes the second logical channel between the second base station and the UE based on the handover request message, and sends a handover response message to the first base station, where the handover response message indicates that the second base station has configured the second logical channel for the UE.

4032. The first base station receives the handover response message sent by the second base station, and performs transmission of the first to-be-transmitted data to the second base station based on the handover response message by using the interface between the first base station and the second base station.

Step 404: When the first base station performs transmission of the different data with the UE and the second base station, the first base station performs transmission of second to-be-transmitted data of the UE with the UE by using a first logical channel.

Step 405: The first base station performs transmission of third to-be-transmitted data of the UE with the second base station by using an interface between the first base station and the second base station, so that the second base station performs transmission of the third to-be-transmitted data with the UE.

It should be noted that during uplink transmission, the first base station may perform transmission of the same data with both the UE and the second base station, that is, perform data transmission based on the foregoing steps 402 and 403; and during downlink transmission, the first base station may perform transmission of same or different data with the UE and the second base station, that is, perform data transmission based on the foregoing steps 402 and 403 or the foregoing steps 404 and 405.

During downlink transmission, the first base station may perform transmission of the same data with both the UE and the second base station, that is, perform data transmission based on the foregoing steps 402 and 403; and during uplink transmission, the first base station may perform transmission of same or different data with the UE and the second base station, that is, perform data transmission based on the foregoing steps 402 and 403 or the foregoing steps 404 and 405.

In this embodiment of the present disclosure, there may be a plurality of second base stations; and operations performed by each of the plurality of second base stations may be the same.

In this embodiment of the present disclosure, when the first base station performs transmission of the same data with both the UE and the second base station, the first base station performs transmission of the first to-be-transmitted data with the UE by using the first logical channel, and performs transmission of the first to-be-transmitted data with the second base station by using the interface between the first base station and the second base station, so that the second base station performs transmission of the first to-be-transmitted data with the UE by using the second logical channel between the second base station and the UE. Transmission of the same data is performed with the UE by using the first logical channel and the second logical channel. Therefore, reliability of a radio link is improved, and a latency of data transmission is reduced.

The following is an apparatus embodiment of the present disclosure, which can be used to perform the method embodiments of the present disclosure. For details undisclosed in the apparatus embodiment of the present disclosure, refer to the method embodiments of the present disclosure.

Figure 10:
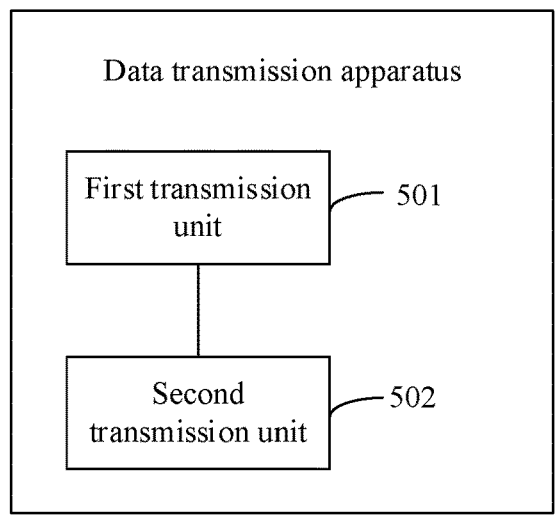
FIG. 10 is a block diagram of a data transmission apparatus according to an embodiment of the present disclosure.

FIG. 10 is a structural block diagram of a data transmission apparatus according to an embodiment of the present disclosure. The apparatus may be implemented as a part or all of user equipment by software, hardware, or a combination of software and hardware.

The apparatus includes a first transmission unit 501 and a second transmission unit 502.

The first transmission unit 501 is configured to perform step 302 in the foregoing embodiment and optional solutions thereof.

The second transmission unit 502 is configured to perform step 303 in the foregoing embodiment and optional solutions thereof.

Figure 11:
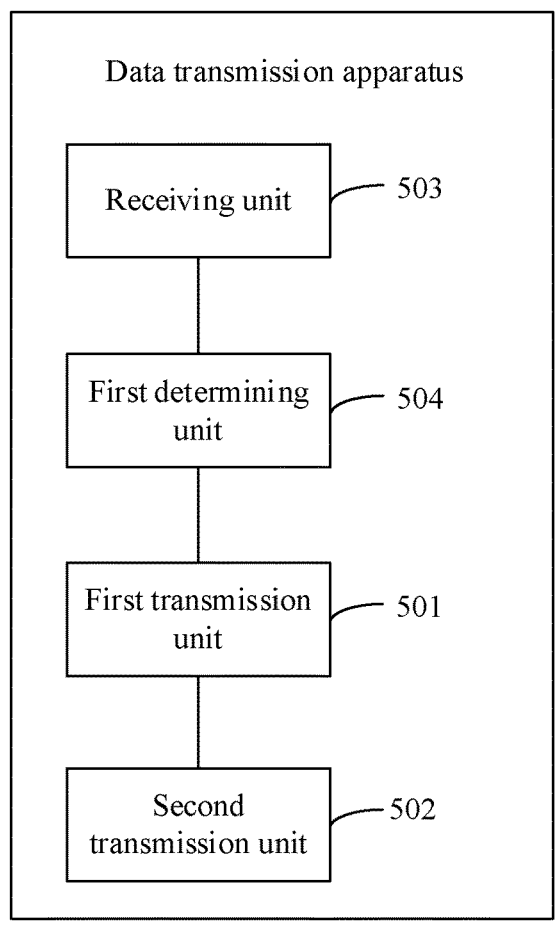
FIG. 11 is a block diagram of another data transmission apparatus according to an embodiment of the present disclosure.

Referring to FIG. 11, in a possible design, the apparatus further includes a receiving unit 503 and a first determining unit 504.

The receiving unit 503 is configured to perform the receiving of the configuration information sent by the first base station in step 301 in the foregoing embodiment and optional solutions thereof.

The first determining unit 504 is configured to perform the determining, based on the configuration information, whether to perform transmission of same data with both the first base station and the second base station in step 301 in the foregoing embodiment and optional solutions thereof.

Figure 12:
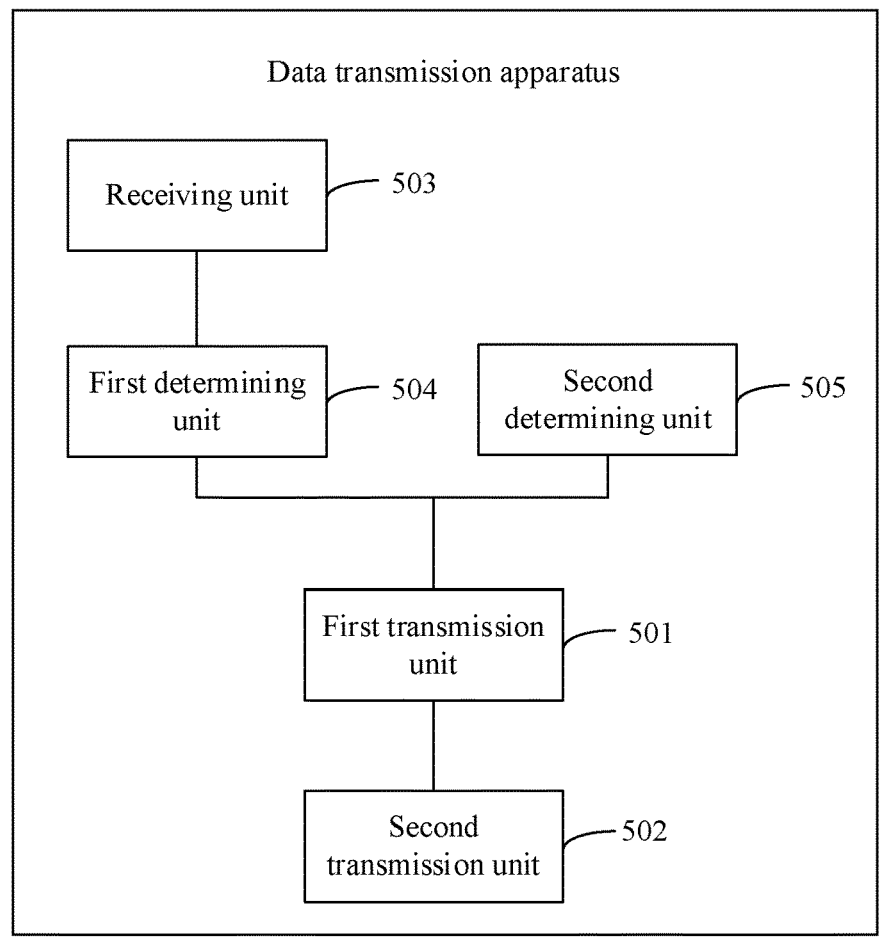
FIG. 12 is a block diagram of still another data transmission apparatus according to an embodiment of the present disclosure.

Referring to FIG. 12, in a possible design, the apparatus further includes a second determining unit 505.

The second determining unit 505 is configured to perform the determining, based on the first radio condition of the current channel, whether to perform transmission of same data with both the first base station and the second base station in step 301 in the foregoing embodiment and optional solutions thereof.

Figure 13:
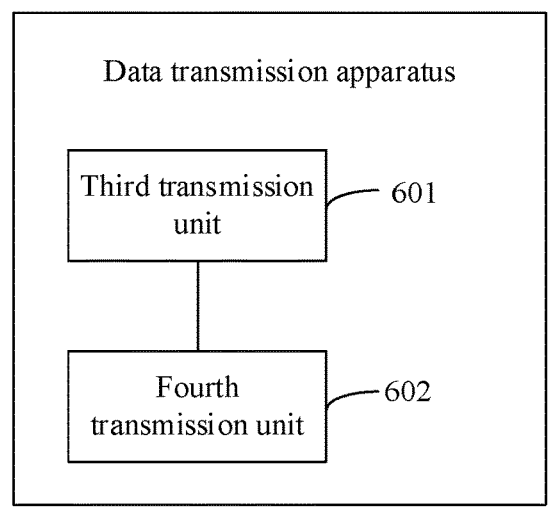
FIG. 13 is a block diagram of yet another data transmission apparatus according to an embodiment of the present disclosure.

FIG. 13 is a structural block diagram of a data transmission apparatus according to an embodiment of the present disclosure. The apparatus may be implemented as a part or all of a first base station by software, hardware, or a combination of software and hardware.

The apparatus includes a third transmission unit 601 and a fourth transmission unit 602.

The third transmission unit 601 is configured to perform step 402 in the foregoing embodiment and optional solutions thereof.

The fourth transmission unit 602 is configured to perform step 403 in the foregoing embodiment and optional solutions thereof.

Figure 14:
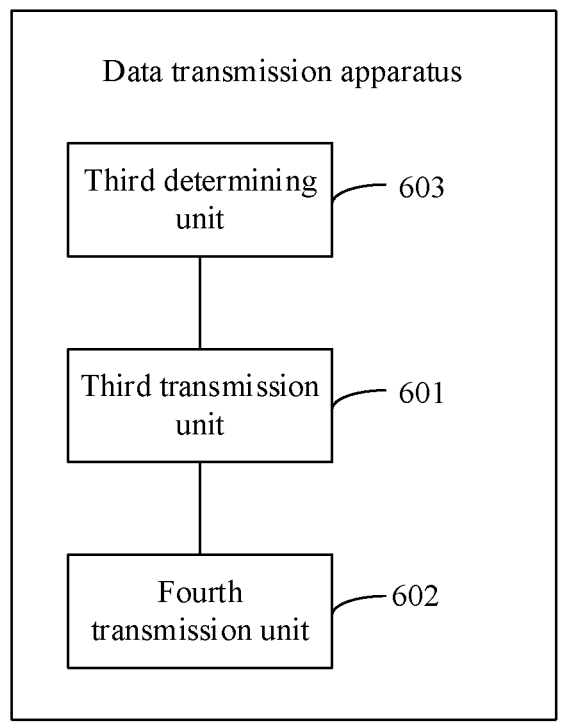
FIG. 14 is a block diagram of still yet another data transmission apparatus according to an embodiment of the present disclosure.

Referring to FIG. 14, the apparatus further includes a third determining unit 603.

The third determining unit 603 is configured to perform step 401 in the foregoing embodiment and optional solutions thereof.

Figure 15:
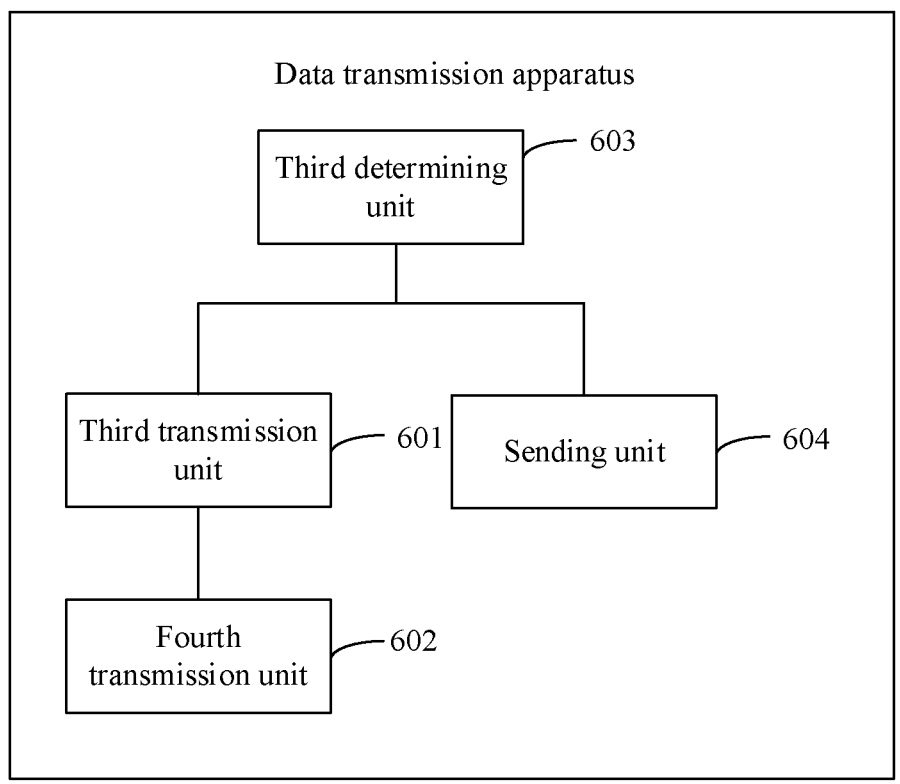
FIG. 15 is a block diagram of a further data transmission apparatus according to an embodiment of the present disclosure.

Referring to FIG. 15, the apparatus further includes a sending unit 604.

The sending unit 604 is configured to perform the sending the configuration information to the UE in step 401 in the foregoing embodiment and optional solutions thereof.

It should be noted that when the data transmission apparatus provided in the foregoing embodiment performs data transmission, division of the foregoing functional modules is merely used as an example for description. In actual application, the foregoing functions may be allocated to different functional modules for implementation as required. In other words, an inner structure of the apparatus may be divided into different functional modules, to implement all or some functions described above. In addition, the data transmission apparatus provided in the foregoing embodiment and the data transmission method embodiment belong to a same inventive concept. For a specific implementation process, refer to the method embodiment, and details are not described herein again.

Figure 16:
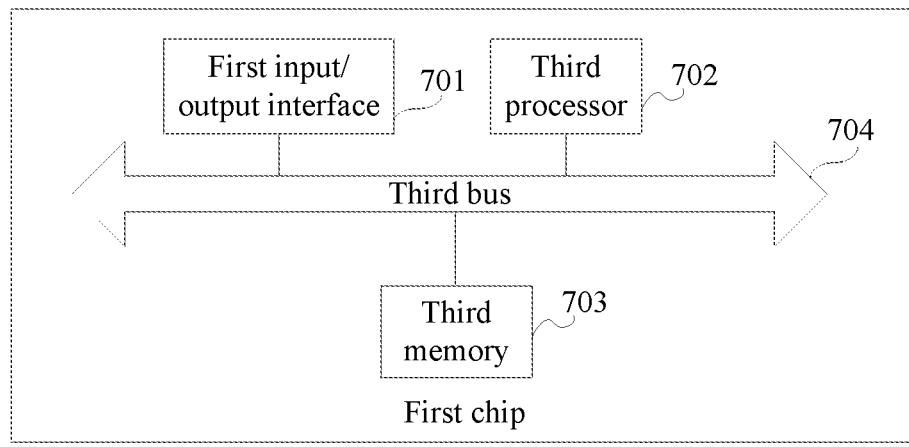
FIG. 16 is a block diagram of a first chip according to an embodiment of the present disclosure.

FIG. 16 is a structural block diagram of a system chip according to an embodiment of the present disclosure. The system chip is applied for UE. To facilitate distinguishing the chip from a chip applied to a base station, the chip is referred to as a first chip. The first chip includes a first input/output interface 701, at least one third processor 702, a third memory 703, and a third bus 704, where the first input/output interface 701 is connected to the at least one third processor 702 and the third memory 703 by using the third bus 704, the first input/output interface 701 is used for communication between the UE and the base station, and the at least one third processor 702 executes an instruction stored in the third memory 703, so that the UE performs the foregoing data transmission method.

Figure 17:
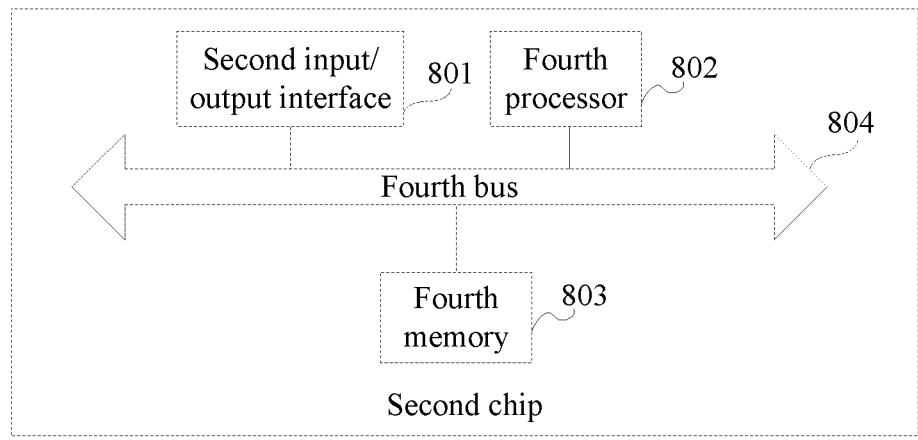
FIG. 17 is a block diagram of a second chip according to an embodiment of the present disclosure.

FIG. 17 is a structural block diagram of a system chip according to an embodiment of the present disclosure. The system chip is applied to a base station (a first base station). To facilitate distinguishing the chip from a chip applied to UE, the chip is referred to as a second chip. The second chip includes a second input/output interface 801, at least one fourth processor 802, a fourth memory 803, and a fourth bus 804, where the second input/output interface 801 is connected to the at least one fourth processor 802 and the fourth memory 803 by using the fourth bus 804, the second input/output interface 801 is used for communication between the base station and the UE, and the at least one fourth processor 802 executes an instruction stored in the fourth memory 803, so that the base station performs the foregoing data transmission method.

The term "and/or" in the present disclosure describes only an association relationship for describing associated objects and represents that three relationships may exist. For example, A and/or B may represent the following three cases: Only A exists, both A and B exist, and only B exists. In addition, the character "/" in the specification generally indicates an "or" relationship between the associated objects.

A person of ordinary skill in the art may understand that all or some of the steps of the foregoing embodiments may be implemented by hardware or a program instructing related hardware. The program may be stored in a computer readable storage medium. The storage medium may include: a read-only memory, a magnetic disk, an optical disc, or the like.

The foregoing descriptions are merely exemplary embodiments of the present disclosure, but are not intended to limit the present disclosure. Any modification, equivalent replacement, and improvement made without departing from the spirit and principle of the present disclosure shall fall within the protection scope of the present disclosure.

What is claimed is:

1. A data transmission method, the method comprising:
    transmitting, by a terminal, to-be-transmitted data of the terminal to a first base station by using a first logical channel between the terminal and the first base station; and
    transmitting, by the terminal, the to-be-transmitted data to a second base station by using a second logical channel between the terminal and the second base station, wherein the transmitting the to-be-transmitted data to the first base station by using the first logical channel is performed simultaneously with the transmitting the to-be-transmitted data to the second base station by using the second logical channel, and wherein the first logical channel and the second logical channel are associated with a same radio bearer of the terminal.

2. The method according to claim 1, further comprising:
    receiving, by the terminal, configuration information from the first base station, wherein the configuration information comprises information about a manner in which the terminal performs data transmission with the first base station and the second base station; and
    in response to determining that the configuration information comprises information indicating that the terminal performs transmission of same data with both the first base station and the second base station, transmitting, by the terminal, of the same data to both the first base station and the second base station.

3. The method according to claim 2, wherein the first logical channel and the second logical channel each belong to a signaling radio bearer (SRB), and the configuration information comprises information indicating that the terminal performs transmission of the same data with both the first base station and the second base station in a diversity mode or a split bearer.

4. The method according to claim 2, wherein the first logical channel and the second logical channel each belong to a data radio bearer (DRB), and the configuration information comprises information indicating that the terminal performs transmission of the same data with both the first base station and the second base station in a diversity bearer or a split bearer.

5. The method according to claim 1, further comprising:
    obtaining, by the terminal, a first radio condition of a current channel; and
    in response to determining that the first radio condition meets a first preset condition, performing, by the terminal, transmission of same data with both the first base station and the second base station.

6. The method according to claim 5, wherein the first preset condition comprises one or more of the following conditions:
    a reference signal received power (RSRP) between the terminal and the first base station is not greater than a first preset power,
    a reference signal received quality (RSRQ) value between the terminal and the first base station is not greater than a first preset value,
    a channel quality indicator (CQI) of a radio channel between the terminal and the first base station is not greater than a second preset value,
    a signal-to-interference-plus-noise ratio (SINR) of the terminal is not greater than a third preset value,
    a signal-to-noise ratio (SNR) of the terminal is not greater than a fourth preset value, a statistical quantity of hybrid automatic repeat request negative acknowledgements (HARQ NACKs) is greater than a fifth preset value, or
    a statistical quantity of automatic repeat request negative acknowledgements (ARQ NACKs) is greater than a sixth preset value.

7. The method according to claim 1, wherein the first base station or the second base station or both are base stations that have a radio access network central unit (CU) and distributed unit (DU) split architecture.

8. An apparatus for data transmission, comprising:
    an interface circuitry; and
    a processor coupled with the interface circuitry, wherein the processor is configured to:
        cause the interface circuitry to transmit to-be-transmitted data of the apparatus to a first base station by using a first logical channel between the apparatus and the first base station; and
        cause the interface circuitry to transmit the to-be-transmitted data to a second base station by using a second logical channel between the apparatus and the second base station; wherein the transmitting the to-be-transmitted data to the first base station by using the first logical channel is performed simultaneously with the transmitting the to-be-transmitted data to the second base station by using the second logical channel, and wherein the first logical channel and the second logical channel are associated with a same radio bearer of the apparatus.

9. The apparatus according to claim 8, wherein the interface circuitry is further configured to receive configuration information from the first base station, wherein the configuration information comprises information about a manner in which the apparatus performs data transmission with the first base station and the second base station; and
    wherein the processor is further configured to, in response to determining that the configuration information comprises information indicating that the apparatus performs transmission of same data with both the first base station and the second base station, perform transmission of the same data with both the first base station and the second base station.

10. The apparatus according to claim 9,
wherein the first logical channel and the second logical channel each belong to a signaling radio bearer (SRB), and the configuration information comprises information indicating that the apparatus performs transmission of the same data with both the first base station and the second base station in a diversity mode or a split bearer.

11. The apparatus according to claim 9,
wherein the first logical channel and the second logical channel each belong to a data radio bearer (DRB), and the configuration information comprises information indicating that the apparatus performs transmission of the same data with both the first base station and the second base station in a diversity bearer or a split bearer.

12. The apparatus according to claim 8, wherein the processor is further configured to:
obtain a first radio condition of a current channel; and
in response to determining that the first radio condition meets a first preset condition, perform transmission of same data with both the first base station and the second base station.

13. The apparatus according to claim 12, wherein the first preset condition comprises one or more of the following conditions:
a reference signal received power (RSRP) between the apparatus and the first base station is not greater than a first preset power,
a reference signal received quality (RSRQ) value between the apparatus and the first base station is not greater than a first preset value,
a channel quality indicator (CQI) of a radio channel between the apparatus and the first base station is not greater than a second preset value,
a signal-to-interference-plus-noise ratio (SINR) of the apparatus is not greater than a third preset value,
a signal-to-noise ratio (SNR) of the apparatus is not greater than a fourth preset value,
a statistical quantity of hybrid automatic repeat request negative acknowledgements (HARQ NACKs) is greater than a fifth preset value, or
a statistical quantity of automatic repeat request negative acknowledgements (ARQ NACKs) is greater than a sixth preset value.

14. The apparatus according to claim 8, wherein the first base station or the second base station or both are base stations that have a radio access network central unit (CU) and distributed unit (DU) split architecture.

15. A non-transitory computer-readable storage medium storing a computer program, such that when the computer program is executed, the following steps are performed:
transmitting, by a terminal, to-be-transmitted data of the terminal to a first base station by using a first logical channel between the terminal and the first base station; and
transmitting, the to-be-transmitted data to a second base station by using a second logical channel between the terminal and the second base station, wherein the transmitting the to-be-transmitted data to the first base station by using the first logical channel is performed simultaneously with the transmitting the to-be-transmitted data to the second base station by using the second logical channel, and wherein the first logical channel and the second logical channel are associated with a same radio bearer of the terminal.

16. The computer-readable storage medium according to claim 15, wherein when the computer program is executed, following steps are further performed:
receiving, by the terminal, configuration information from the first base station, wherein the configuration information comprises information about a manner in which the terminal performs data transmission with the first base station and the second base station; and
in response to determining that the configuration information comprises information indicating that the terminal performs transmission of same data with both the first base station and the second base station, performing, by the terminal, transmission of the same data with both the first base station and the second base station.

17. The computer-readable storage medium according to claim 16,
wherein the first logical channel and the second logical channel each belong to a signaling radio bearer (SRB), and the configuration information comprises information indicating that the terminal performs transmission of the same data with both the first base station and the second base station in a diversity mode or a split bearer.

18. The computer-readable storage medium according to claim 16,
wherein the first logical channel and the second logical channel each belong to a data radio bearer (DRB), and the configuration information comprises information indicating that the terminal performs transmission of the same data with both the first base station and the second base station in a diversity bearer or a split bearer.

* * * * *

UNITED STATES PATENT AND TRADEMARK OFFICE
CERTIFICATE OF CORRECTION

PATENT NO. : 10,735,164 B2
APPLICATION NO. : 16/393686
DATED : August 4, 2020
INVENTOR(S) : Zhang et al.

Page 1 of 1

It is certified that error appears in the above-identified patent and that said Letters Patent is hereby corrected as shown below:

In the Claims

Claim 2, Column 25, Line 51: "of" should be deleted.

Signed and Sealed this
Twenty-sixth Day of October, 2021

Drew Hirshfeld
*Performing the Functions and Duties of the
Under Secretary of Commerce for Intellectual Property and
Director of the United States Patent and Trademark Office*